(12) United States Patent
DeAngelis et al.

(10) Patent No.: US 7,454,925 B2
(45) Date of Patent: Nov. 25, 2008

(54) METHOD OF FORMING A GLASS MELT

(75) Inventors: Gilbert DeAngelis, Lindley, NY (US); William Weston Johnson, Painted Post, NY (US); John Jerry Kersting, Painted Post, NY (US); Daniel Arthur Nolet, Danville, KY (US); Robert Richard Thomas, Watkins Glen, NY (US); Pascal Verdurme, Veneux les Sablons (FR)

(73) Assignee: Corning Incorporated, Corning, NY (US)

( * ) Notice: Subject to any disclaimer, the term of this patent is extended or adjusted under 35 U.S.C. 154(b) by 385 days.

(21) Appl. No.: 11/323,848

(22) Filed: Dec. 29, 2005

(65) Prior Publication Data

US 2007/0151297 A1    Jul. 5, 2007

(51) Int. Cl.
*C03B 5/26* (2006.01)
(52) U.S. Cl. .............. 65/324; 65/325; 65/326; 65/327; 65/335; 65/134.1; 65/135.1; 65/DIG. 9
(58) Field of Classification Search .......... 65/128, 65/136, 134, 134.5, 135, 337, 324–327, 335
See application file for complete search history.

(56) References Cited

U.S. PATENT DOCUMENTS

| | | | | |
|---|---|---|---|---|
| 2,331,052 A | 10/1943 | Shadduck | ...................... | 49/77 |
| 2,866,838 A | 12/1958 | Paxton | ............................. | 13/6 |
| 2,902,524 A | 9/1959 | Paxton | ............................. | 13/6 |
| 3,015,190 A | 1/1962 | Arbeit | ........................... | 49/54 |
| 3,160,692 A | 12/1964 | Paxton | ............................. | 13/6 |
| 3,206,295 A * | 9/1965 | Mattern | ...................... | 65/178 |
| 3,457,059 A | 7/1969 | Boettner | ...................... | 65/161 |
| 3,811,858 A | 5/1974 | Ernsberger et al. | ............ | 65/135 |
| 3,997,710 A | 12/1976 | Maddux | .......................... | 13/6 |
| 4,029,887 A * | 6/1977 | Spremulli | ...................... | 373/32 |
| 4,213,599 A * | 7/1980 | Dewing et al. | ............... | 266/166 |
| 4,352,687 A | 10/1982 | Boettner | ........................ | 65/134 |
| 4,365,987 A | 12/1982 | Boettner | ........................ | 65/134 |
| 4,366,571 A * | 12/1982 | Palmquist | ..................... | 373/30 |
| 4,388,721 A | 6/1983 | Hall, Jr. et al. | ................. | 373/31 |
| 4,426,217 A | 1/1984 | Farrar et al. | .................... | 65/135 |
| 4,594,089 A * | 6/1986 | Kurata | ......................... | 65/135.8 |
| 4,676,427 A * | 6/1987 | Constance | ................... | 228/189 |
| 4,726,831 A * | 2/1988 | Fogle et al. | .................. | 65/135.6 |
| 4,738,742 A * | 4/1988 | Shishkin et al. | .............. | 156/391 |
| 5,002,600 A * | 3/1991 | Sorg et al. | ..................... | 65/346 |

(Continued)

FOREIGN PATENT DOCUMENTS

JP    2-221129    1/1990

(Continued)

*Primary Examiner*—Carlos Lopez
*Assistant Examiner*—Jodi Cohen
(74) *Attorney, Agent, or Firm*—Kevin M. Able

(57) ABSTRACT

A method of forming a glass melt including heating a glass feed material in a first melting furnace to form a glass melt, flowing the glass melt into a second melting furnace through a refractory metal connecting tube, and further heating the glass melt in the second melting furnace. The refractory metal connecting tube is heated to prevent the molten glass from excessive cooling, and to ensure that the glass melt entering the second melting furnace is equal to or greater than the temperature of the glass melt in the second melting furnace. An apparatus for performing the method is also disclosed.

15 Claims, 3 Drawing Sheets

U.S. PATENT DOCUMENTS

| | | | |
|---|---|---|---|
| 5,131,005 A * | 7/1992 | Takajo et al. | 373/27 |
| 5,451,284 A * | 9/1995 | Ikeda et al. | 156/247 |
| 5,509,951 A | 4/1996 | Baucke et al. | 65/134.6 |
| 5,603,533 A * | 2/1997 | Hayashi | 285/334.2 |
| 5,665,137 A * | 9/1997 | Huang | 65/134.1 |
| 5,785,726 A * | 7/1998 | Dorfeld et al. | 65/134.1 |
| 5,939,016 A * | 8/1999 | Mathiesen et al. | 266/45 |
| 5,961,686 A | 10/1999 | Chenoweth | 65/540 |
| 6,227,007 B1 | 5/2001 | Palmquist | 65/26 |
| 6,286,337 B1 * | 9/2001 | Palmquist | 65/157 |
| 6,334,337 B1 | 1/2002 | Macedo et al. | 65/134.5 |
| 6,647,747 B1 * | 11/2003 | Brik | 65/492 |
| 6,698,244 B1 | 3/2004 | Romer et al. | 65/134.3 |
| 6,769,272 B2 | 8/2004 | Roeth et al. | 65/134.9 |
| 6,810,689 B2 | 11/2004 | Romer et al. | 65/134.3 |
| 6,854,291 B2 | 2/2005 | Romer et al. | 65/134.5 |
| 6,871,514 B2 | 3/2005 | Muschik et al. | 65/33.9 |
| 6,889,527 B1 * | 5/2005 | Romer et al. | 65/347 |
| 2002/0035855 A1 | 3/2002 | Romer et al. | 65/134.4 |
| 2002/0092325 A1 | 7/2002 | Muschik et al. | 65/134.3 |
| 2002/0121113 A1 | 9/2002 | Gohlke et al. | 65/134.4 |
| 2007/0022780 A1 * | 2/2007 | House et al. | 65/29.21 |

FOREIGN PATENT DOCUMENTS

JP     5-229831 T5     9/1993

* cited by examiner

METHOD OF FORMING A GLASS MELT

BACKGROUND OF THE INVENTION

1. Field of the Invention

This invention is directed to a method of forming a glass melt, and in particular forming a glass melt utilizing a multi-zone melter.

2. Technical Background

Liquid crystal displays (LCDs) are passive flat panel displays which depend upon external sources of light for illumination. Alkali-free alumino-silicate glasses are commonly used for LCD sheet glass applications. This family of glasses tends to create a stable foam layer on the surface of the melting furnace (melter) in a location where the batch (glass feed) materials are filled. The foam layer contains solid silica inclusions that can become either solid "stone" or clear "knot" defects in the finished glass unless they are removed prior to the glass entering the delivery system. It has been shown that this foam layer, when allowed to reach the front wall of the melter, can deliver solid inclusions via the melter exit to the glass delivery system. These solid inclusions can become solid defects in the finished glass. The foam layer also insulates the glass melt from heat supplied by combustion burners above the free surface of the glass melt. The subsequent poor efficiency of the burners means that most of the energy required to form the melt is provided by Joule heating from electrodes submerged below the free surface of the melt. The resulting relatively high levels of electric power shortens electrode life and leads to frequent melter repairs.

A single melter with two or more zones can prevent the silica inclusions resident in the foam layer from entering the glass delivery system. A wall separating the first and second zones can prevent the foam layer in the first zone from entering the second zone. Historically, division of a melter into multiple zones has been done with either an internally-cooled cross wall with one or more slot-shaped throats (dividing one large glass bath into two smaller zones) or with two separate chambers connected with a tunnel-shaped throat.

In the case of the cross wall, both sides of the cross wall are hot and generally corrosion of the wall by the glass is relatively fast. Thus, process life is short. Melting effectiveness ends when the top of the cross wall is breached or when internal cooling fails, releasing cooling water directly (and explosively) into the glass melt. Furthermore, if the cross wall is constructed of fused zirconia refractory, the electrical resistivity of the cross wall will be low, and both faces will be hot. Some of the electric current used to heat the glass bath may pass through the cross wall, heating it independently and potentially causing failure of the wall or formation of zirconia inclusions in the melt. Generally, cross walls are effective for limited periods of time but represent a life-limiting part of a glass melting process.

The conventional approach to these problems is to enlarge the melter. It is estimated that to achieve a foam-free surface would require at least a doubling of the present-day melt surface area. Further, to reduce solid and gaseous inclusions to the desired level would require another multiple, bringing the total enlarged melter size to three times the present day surface area. Such large increases in the dimensions of the melting furnace lead to increased capital and operating expenses, and, because the number of electrodes (typically tin oxide) would necessarily increase, may also result in raising the amount of tin oxide in the glass to levels where Cassiterite devitrification of the melt can occur.

Melters can also be separated into zones that do not share a common wall. In this case, the first and second zones may have their own walls that are connected by a tunnel-shaped throat. This allows the walls to have exterior cooling but creates a significant unheated area within the melter where the glass can lose temperature as it passes from the first zone to the second zone. The effectiveness of the second zone in melting out solid inclusions or fining out gaseous inclusions diminishes when the glass enters the second zone colder than it exited the first zone. In addition, refractory throat covers will wear away to the glass level, ultimately allowing the foam layer to pass through from the first to the second zone. A throat leak can cause shutdown of the process altogether.

For a two-zone melter to be effective in keeping the solid inclusions entrained within the foam layer from entering the delivery system, the separation between the first and second zones must retain its integrity. Otherwise, the melter becomes one large container that allows the foam layer to move forward to the front-wall and deliver solid inclusions from the foam layer into the glass delivery system.

When a melting process comprised of two or more zones is effective, the foam layer is prevented from forming in the second zone and additional time and temperature is available in the second zone to melt out the solid inclusions or fine out gaseous inclusions that enter it.

SUMMARY

Embodiments of the present invention a method and apparatus for forming a glass melt.

Briefly described, one embodiment of the method comprises heating a glass feed material to a first temperature within a first melting furnace to form a glass melt, flowing the glass melt from the first melting furnace to a second melting furnace separate from the first melting furnace through a connecting tube comprising a refractory metal, heating the glass melt to a second temperature in the second melting furnace, wherein the glass melt flowing through the connecting tube is heated by the connecting tube to a third temperature such that the third temperature is equal to or greater than the second temperature. The refractory metal should be capable of withstanding the high melting temperatures in the first and second melting furnaces without adding significant impurities to the glass melt. The refractory metal is preferably selected from the group consisting of ruthenium, rhodium, palladium, osmium, iridium, platinum, molybdenum, tungsten and alloys thereof.

The walls of the melters are typically quite thick—on the order of about 8 inches—and are themselves unheated. Molten glass passing through the walls of the melters lose heat during transfer between the first and second melting furnaces, to say nothing of the heat loss within the passage between the two furnaces. To ensure that the glass melt flowing from the first melting furnace, through the connecting tube and into the second melting furnace is at an appropriate temperature prior to entering the second melting furnace, the connecting tube is heated at least within the back wall of the second melting furnace, and is preferably also heated between the front wall of the first melting furnace and the back wall of the second melting furnace. Heating the connecting tube within the first melting furnace is may be performed, but is generally unnecessary. The transfer tube may be heated by a variety of methods, including flowing a current through the tube directly from an external power source, or by induction heating of the tube.

Preferably, the melt rate of the second furnace is between about 50% and 90% of the melt rate of the first furnace. The glass melt within the second melting furnace may also be mechanically agitated. Mechanical agitation may be performed by, for example, bubbling a gas through the glass melt in the second melting furnace. Oxygen is one suitable gas, but air and inert gases are also acceptable alternatives. Advantageously, oxygen may be used to recharge or reload multivalent fining agents within the melt. Reloading the fining agent with oxygen is most effective when the temperature of the glass melt is lowered during the reloading.

In one particular embodiment, the partial pressure of hydrogen in an atmosphere in contact with the refractory metal transfer tube may be controlled so as to promote vigorous boiling of the glass melt passing through the transfer tube. This can be accomplished by lowering the partial pressure of hydrogen in the atmosphere outside the tube such that it is lower than the partial pressure of hydrogen within the glass melt.

The present invention can also be viewed as providing an apparatus for performing the methods of the invention. In this regard, one embodiment of such an apparatus, among others, can be broadly summarized by a first melting furnace for heating a glass fed material to form a glass melt, the first melting furnace comprising a front wall, a second melting furnace comprising a back wall, a refractory metal tube connecting the first and second melting furnaces for transporting the glass melt from the first melting furnace to the second melting furnace. The tube may be heated by flowing a current directly through the tube, or by induction heating.

The tube comprises a first end, a second end, a contiguous outer surface disposed between the first and second ends. To provide access to electrical connections and to ensure that the portion of the tube disposed within the back wall of the second melting furnace is heated, the second end of the tube may be turned inside out and folded back on itself such that the second end is concentric about the tube outer surface. Thus, when the portion of the tube proximate the second end is inserted into an opening in the back wall of the second melting furnace, the second end is accessible to an electrical connection, and current can be flowed through the portion of the tube disposed within the backwall.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods features and advantages be included within this description, be within the scope of the present invention, and be protected by the accompanying claims.

DETAILED DESCRIPTION

Figure 1:
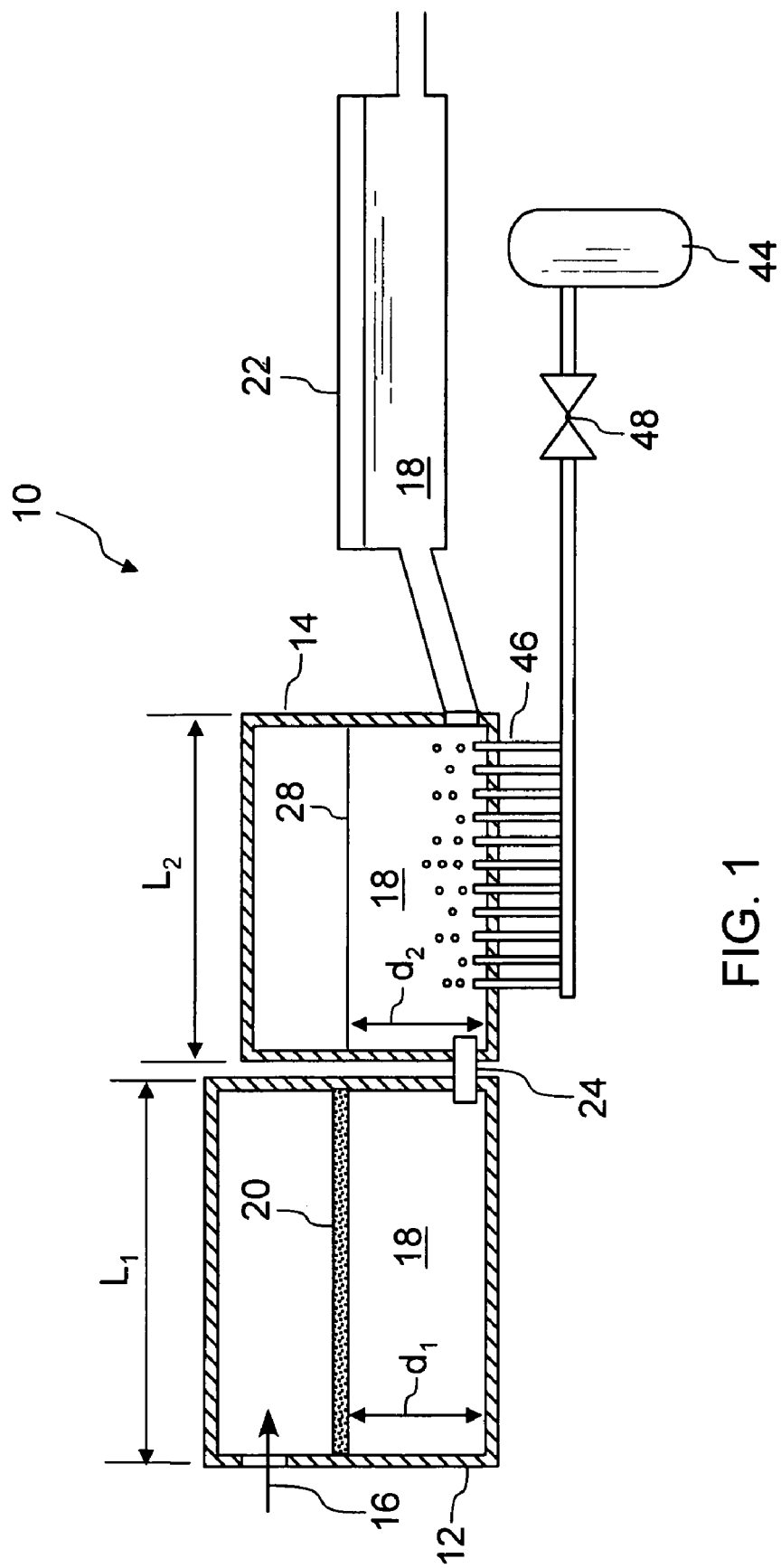
FIG. 1 is a cross sectional side view of an apparatus according to an embodiment of the present invention.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

In a conventional glass making process raw feed materials are heated in a furnace (melter) to form a viscous mass, or glass melt. Furnaces are generally constructed from non-metallic refractory blocks comprised of burned flint clay, sillimanite, zircon or other refractory material. The feed materials may be introduced into the melter either by a batch process, wherein the glass forming constituents are mixed together and introduced into the melter as a discrete load, or the feed materials may be mixed and introduced into the melter continuously. The feed materials may include cullet. The feed materials may be introduced into the melter through an opening or port in the furnace structure, either through the use of a push bar or scoop, in the case of a batch process, or in the case of a continuous feed melter, a screw or auger apparatus may be used. The amount and type of feed material constituents comprises the glass "recipe". Batch processes are typically used for small amounts of glass and used in furnaces having a capacity on the order of up to a few tons of glass, whereas a large commercial, continuous feed furnace may hold in excess of 1,500 tons of glass, and deliver several hundred tons of glass per day.

The feed materials may be heated in the melter by a fuel-air (or fuel-oxygen) flame issuing from one or more burners above the feed material, by an electric current passed between electrodes typically mounted in the interior melter walls, or both. A crown structure above the walls, also made from refractory block, covers the melter and, in a combustion-heated furnace, provides a space for combustion of the fuel.

In some processes, the feed materials are first heated by a fuel-air flame, whereupon the feed materials begin to melt and the resistivity of the feed materials decreases. An electric current is thereafter passed through the feed materials/melt mixture to complete the heating and melting process. During the heating, reaction of the feed materials releases a variety of gases which form inclusions, commonly referred to as blisters or seeds, within the glass melt. Seeds may also form as a result of air trapped within the interstitial spaces between the particles of feed material, and from dissolution of the refractory blocks themselves into the melt. The gases which may constitute seeds may comprise, for example, any one or a mixture of $O_2$, $CO_2$, $CO$, $N_2$ and $NO$. If not removed, seeds may be passed through the glass making process and, undesirably, into the eventual glass product. The removal of gaseous inclusions is referred to as fining. Solid inclusions may also make their way into the final product if incomplete melting and dissolution occurs, for example if the melt experiences an insufficient residence time at appropriate temperatures during melting. Solid inclusions which may comprise the melt are unmelted feed materials (stones) and small regions of the glass melt (knots) that have not fully melted and are not homogeneous with the rest of the melt, possessing a refractive index different from the bulk melt During melting, a foamy mass (scum) may form on the surface of the melt. This is particularly true for alkali-free alumino-silicate glasses. Without wishing to be held to theory, it is believed the foamy mass is due to a degree of alumina and silica stratification, wherein the more viscous but less dense silica-rich glass floats above less viscous but heavier alumina-rich glass. Seeds which rise upward through the melt become trapped in the viscous silica-rich glass, forming a foam layer overtop the melt. This foamy mass may also include raw feed materials, and byproducts of the melting process. As the molten glass is pulled or drawn from the furnace, elements of the foamy mass, such as unmelted feed materials, can be drawn from the surface of the melt through the melting furnace outlet, thereby short circuiting the otherwise desired residence time within the furnace necessary for full melting to occur. That is, normal convection currents within the glass melt act to cycle the feed materials, in various stages of dissolution, through the volume of the melt, and provide sufficient time within the hot melt for the feed materials to be fully integrated or dissolved into the melt. Stones, for example, which may reside within the foamy mass at the surface of the melt proximate the front wall of the melting furnace may be drawn downward from the surface, and exit the furnace without having been cycled through the volume of the melt. Such contaminates—stones, knots, etc. may then ultimately find their way into the final glass product.

In accordance with an embodiment of the present invention, a multi-zone melting apparatus is shown, generally indicated by reference numeral 10, comprising a first melting furnace 12 and a second melting furnace 14 separate from the first melting furnace. The first and second melting furnaces are generally comprised of refractory blocks as previously disclosed. Glass feed materials are fed into first melting furnace 12, as indicated by arrow 16, and are melted to form glass melt 18. The melting process can form a layer of scum or foam 20 on the surface of glass melt 18 within first melting furnace 12, such as in the case of alkali-free alumino-silicate glasses used for display applications. As previously noted, this foam surface layer may comprise both gaseous and solid inclusions, including undissolved feed materials. Melting apparatus 10 may also include fining vessel 22 for removing gaseous inclusions from the glass melt.

First melting furnace 12 is connected to second melting furnace 14 by a connecting tube 24, preferably cylindrical, extending between the first and second melting furnaces. In this context, what is meant by the first furnace being separate from the second furnace is that the furnaces do not share a common wall between the two volumes of glass melt contained in the respective furnaces, and when in operation, the atmospheres in contact with the free (exposed) surface of the two glass melt volumes are not in direct contact with each other.

Connecting tube 24 is comprised of a refractory metal which is compatible with the temperature and chemistry of the glass. That is, connecting tube 24 must maintain its structural integrity at temperatures as high as about 1650° C. and produce minimum contamination of the glass. Connecting tube 24 must also be relatively easy to heat in order to increase or maintain the temperature of the molten glass flowing through tube 24. Connecting tube 24 is preferably comprised of a refractory metal selected from the platinum group, or alloys thereof. The platinum group metals—ruthenium, rhodium, palladium, osmium, iridium, and platinum—are characterized by resistance to chemical attack, excellent high-temperature characteristics, and stable electrical properties. Other suitable refractory metals include molybdenum. Tube 24 may be heated, for example by induction heating, by flowing a current directly through the tube, or by external heating elements.

Figure 2:
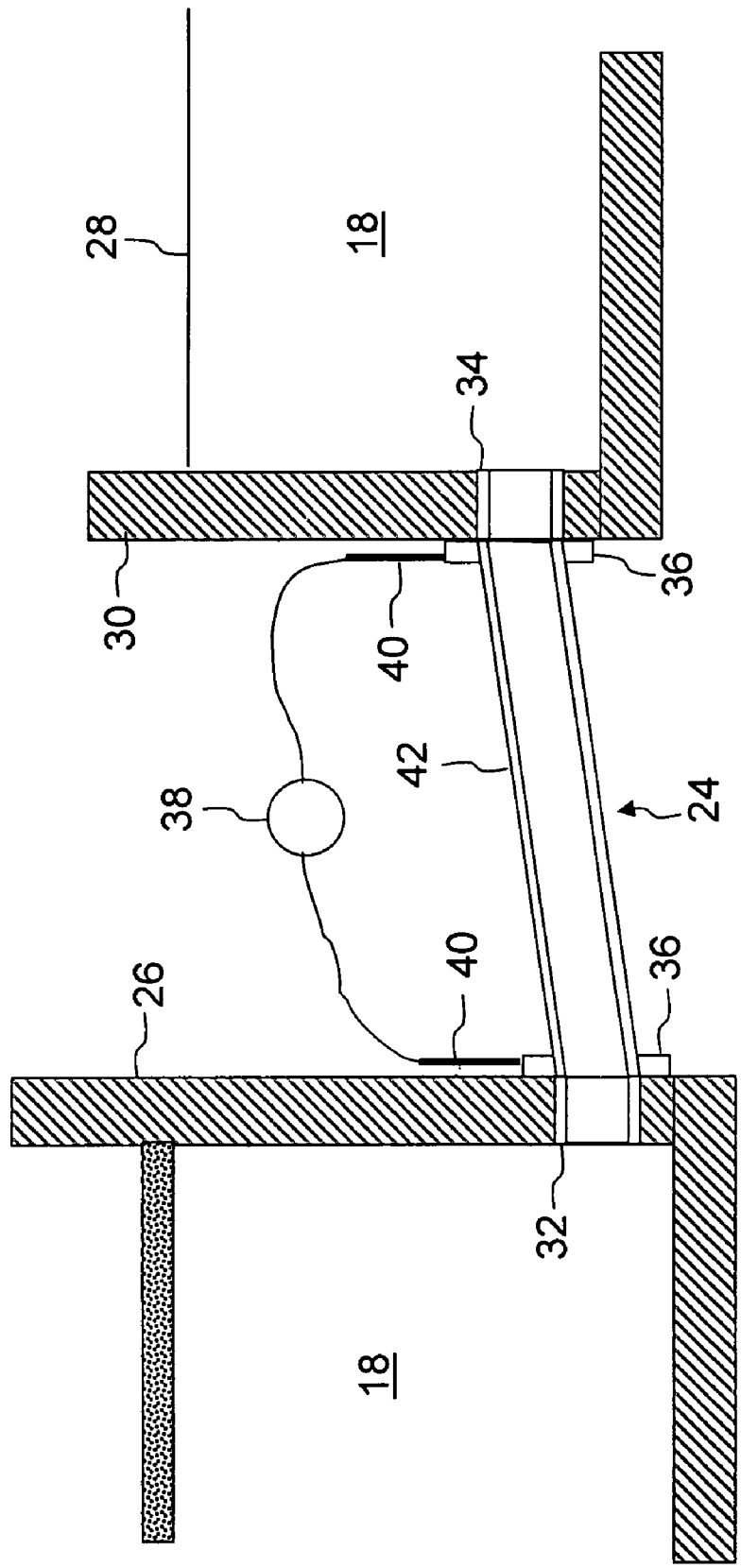
FIG. 2 is a cross sectional side view showing an embodiment of the transfer tube between the first melting furnace and the second melting furnace.

As shown in FIGS. 1-2, tube 24 exits first melting furnace 12 through an opening submerged below the surface of glass melt 18 in first melting furnace front wall 26 and enters second melting furnace 14 through a similar opening submerged below surface 28 of glass melt 18 in second melting furnace back wall 30. Thus, as illustrated in FIG. 2, tube 24 includes a first end 32 and a second end 34 opposite first end 32. FIG. 2 shows tube 24 as it exits front wall 26 and enters back wall 30. A portion of tube 24 proximate each end 32, 34 is disposed within the refractory wall of the respective melting furnaces, i.e. a portion of tube 24 is disposed within first melting furnace front wall 26, and a portion of tube 24 is disposed within second melting furnace back wall 30. In the instance where tube 24 is heated by flowing a current through the tube, a flange 36 is attached to tube 24 at front wall 26 and at back wall 30. Flanges 36 serve as electrical contact points for direct resistance heating of tube 24, and may be connected to the power source 38, for example, by buss bars or cables 40. Preferably, flanges 36 are cooled, such as by flowing a liquid (e.g. water) through passages on or in the flanges. Each end 32, 34 is preferably disposed near the mid-point across the width of the respective furnace wall, and further disposed proximate the bottom of the respective furnace.

Figure 3:
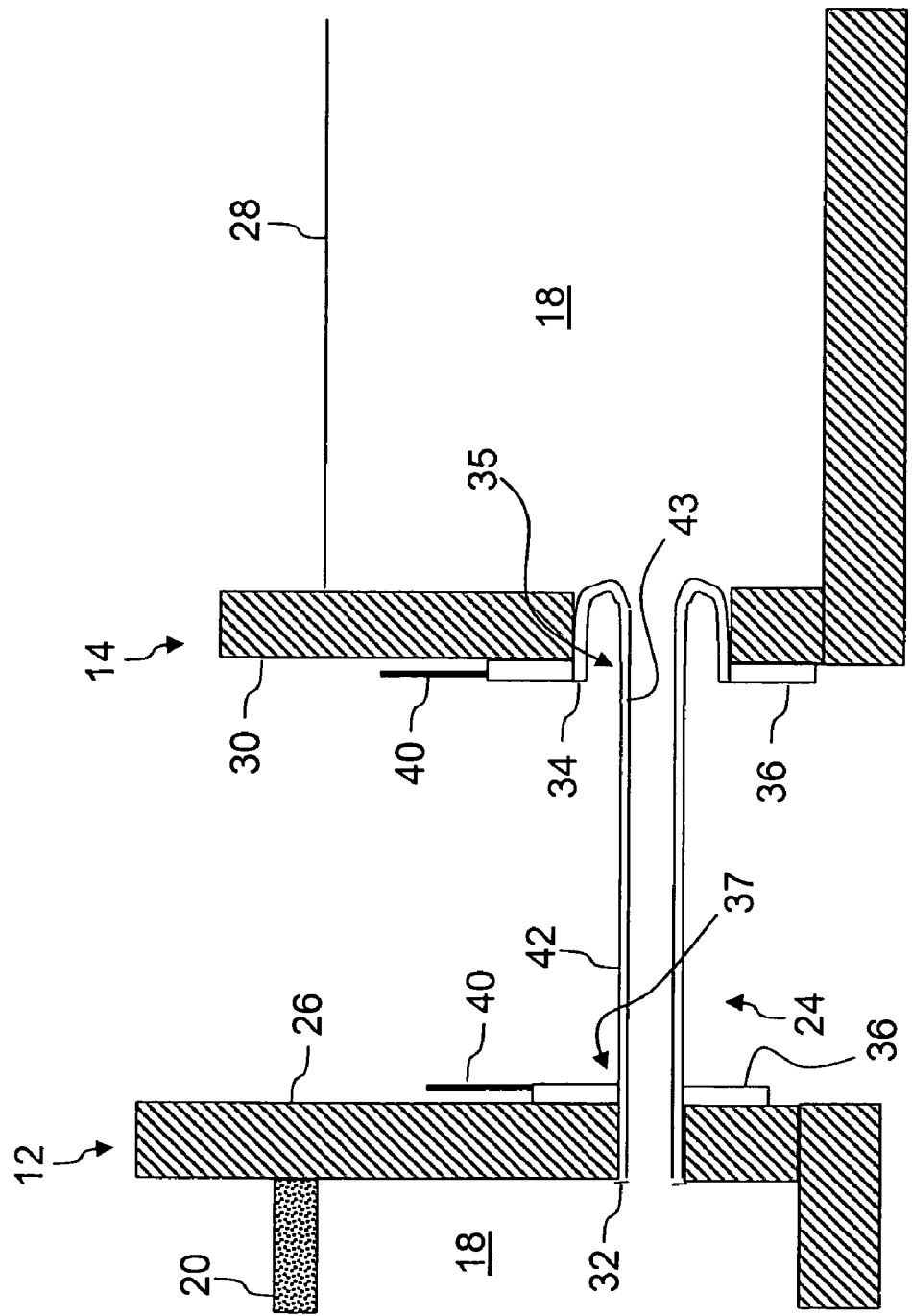
FIG. 3 is a cross sectional side view of an embodiment of the transfer tube wherein the second end of the transfer tube has been turned inside out and the tube folded back on itself such that the second end of the transfer tube is concetric with the outside surface of the transfer tube.

Although glass melt 18 is heated within furnaces 12, 14 by fuel-air or fuel-oxy burners and/or electric current passed through electrodes in contact with the glass melt, the refractory walls of the furnace are themselves not typically directly heated. Therefore, as the molten glass flows from first melting furnace 12 to second melting furnace 14 through tube 24, the molten glass loses heat as the melt passes through the walls of the furnaces. To ensure that the molten glass enters the second melting furnace at a temperature substantially the same as the average temperature of the first melt, tube 24 is heated, as previously disclosed. Resistance heating of tube 24 is preferred, and is accomplished by flowing an electric current, preferably an alternating current, through the tube. Alternatively, the tube may be heated by induction. Because the refractory walls of the melting furnaces are not themselves directly heated, molten glass passing through the wall openings and an unheated connecting tube between furnaces could lose as much as 100° C. in temperature, perhaps more. If the temperature of the melt entering the second furnace is significantly cooler than the temperature of the melt within the second furnace, for example, 100° C. cooler, the cooler glass entering second furnace 14 may have a tendency to sink to the bottom of the furnace and flow directly to the furnace exit. This short-circuiting across the bottom of the furnace would reduce the residence time of the glass and potentially lead to stones and knots leaving second furnace 14 without complete dissolution within the melt. Typically, the melt within second furnace 14 is at a higher temperature than the melt in first furnace 12. A method of heating tube 24 within at least back wall 30 where tube 24 enters second melting furnace 14, as well as within that portion of the tube between the walls, is also desirable. Simply inserting a connecting tube 24 that is directly heated by electric current passing through it into the first and second melting furnaces as a straight pipe between the two melting furnaces and attaching an electrical connection to the pipe where it exits or enters a melting furnace may not provide satisfactory heating of the passage—the current will flow through the pipe between the two connections, but because no current flows within the portions of the pipe within the walls of the furnaces, heating of those portions will not occur. Consequently, in accordance with an embodiment of the present invention and as depicted in FIG. 3, end 34 of tube 24 is turned inside out and folded back on itself so that end 34 is concentric with the contiguous outside surface 42 of tube 24 and even with first intermediate position 35 along the length of the tube between the first and second melting furnaces 12 and 14. The folded back end 34 does not contact the outside surface of the tube proximate first intermediate position 35 and allows easy access to end 34 for an electrical connection. Thus, as shown in FIG. 3. flange 36 may be connected to end 34 at first intermediate position 35, and an electric current may flow through that portion of tube 24 proximate end 34 and disposed within back wall 30 of melting furnace 14 to a second electrical connection at second intermediate position 37 outside front wall 26 of first melting furnace 12. This inside out configuration for tube 24 may be made at each end portion of tube 24, but in a typical setup, only end 34 is folded back. This is because the temperature of the molten glass as it enters the second melting furnace is of greater interest than the temperature of the glass as it leaves the first melting furnace. Preferably, heating of connecting tube 24 is effective in heating the glass melt within the tube such that the temperature of the molten glass entering second melting furnace 14 is substantially equal to the temperature of the melt within first furnace 12 before entering the tube. By substantially equal what is meant is that the temperature of the glass melt entering the second furnace should be within about 25° C. of the temperature of the glass melt within the first furnace.

Second melting furnace 14 is preferably constructed so as to provide for a lower melting rate than first melting furnace 12. The melting rate in the first melting furnace is selected to be equal to or greater than the minimum melt rate necessary to put the feed materials into solution. Second melting furnace 14 has a melting rate which is preferably between about 50% and 90% of the melting rate of first melting furnace 12. It should be noted that, as used herein, melting rate is expressed in units of surface area divided by the flow rate of glass from the furnace, e.g. meters squared divided by tons per day ($m^2$/tons/day). Thus, for a given flow rate, the required furnace dimensions may be easily calculated. Preferably, length $L_2$ of second melting furnace 14 is between about 30% and 50% of the length $L_1$ of first melting furnace 12. The operating depth $d_2$ of the glass melt within second melting furnace 14 should be chosen to maximize both the temperature of the melt and the residence time of the melt within the furnace, and should be between about 65% and 110% of the depth $d_1$, of the glass melt within first melting furnace 12.

Advantageously, the atmosphere about tube 24 between first and second melting furnaces 12, 14 can be regulated so as to provide a pre-determined partial pressure of hydrogen within the atmosphere. As disclosed, for example, as disclosed in U.S. patent application Ser. No. 11/116,669, filed on Apr. 27, 2005, the partial pressure of hydrogen outside and in contact with connecting tube 24 may be used to control the removal of gaseous inclusions in molten glass within a refractory metal vessel. Such control is facilitated by enclosing the vessel in an enclosure surrounding the vessel, the enclosure surrounding the vessel enclosing also an atmosphere in contact with the refractory metal vessel. Cooling of the glass as it exits through front wall 26 of first melting furnace 12 can be used to reload the multivalent fining agent or agents within the glass with oxygen. By subsequently lowering the hydrogen partial pressure of the atmosphere in contact with tube 24 outside the walls of the melting furnaces, hydrogen permeation from the glass melt through and out of tube 24 can be encouraged, causing a release of oxygen and vigorous bubbling within the molten glass transiting the tube. This large oxygen release can aid in the coalescence of seeds within the melt. Reloading of the fining agent can be used to improve initial fining within second melting furnace 14 and during later fining steps, such as within fining vessel 22 downstream of and in fluid communication with second melting furnace 14. The partial pressure of hydrogen of the atmosphere contacting tube 24 may be controlled, for example, by controlling the effective dew point of the atmosphere in contact with tube 24.

Careful control of oxygen reloading within connecting tube 24 can also be used to create localized oxygen release within melting furnace 14. Thus, the release of oxygen and subsequent upwelling of the melt within second melting furnace 14 can improve flow stability of the melt, promote homogenization of the melt by inducing mechanical stirring, and aid fining. In addition, as shown in FIG. 1, a gas, preferably oxygen, may be bubbled into the melt in the second melting furnace from source 44, such as, for example, through pipes or nozzles 46 in the floor of the furnace. Valve 48 may be used to control the volume of gas which is bubbled through the melt. Although oxygen bubbling through the introduction of excess oxygen via appropriate piping can be accomplished within the first melting furnace, such bubbling may cause particulate from the surface foam 20 in the first furnace to be drawn into and mixed with the melt, thereby potentially leading to an increase in defects in the finished glass. Mechanical stirring of the melt within the second melting furnace can also be accomplished through stirring with a stirring device, such as a paddle stirrer. However, the high temperature present within the melt may limit the mechanical integrity of such stirrers.

In accordance with the present invention, unlike the surface of the melt in first melting furnace 14, surface 28 of the glass melt within second melting furnace 14 is substantially free of foam, particulate and other contaminating features as described herein. The foam-free surface of the melt in second furnace 14 can provide for greater thermal efficiency of combustion burners (not shown) located above the surface of the melt. The foam layer 20 present in melting furnace 12 acts to insulate the surface of the glass melt from heat generated by combustion burners. Consequently, approximately 75% of the heat generated for melting in first melting furnace 12 occurs due to Joule heating by electric current, with an approximately 25% contribution from fuel-oxygen burners above glass melt 18. Electric melting is energy efficient, but the local temperatures on the sidewalls near the electrodes can be very high and refractory life is usually shorter for electric melting than for primarily combustion melting. On the other hand, the substantially foam-free surface of glass melt 18 in second melting furnace 14 may allow for a significant amount of heat to be contributed to the melt by fuel-oxygen burners rather than electric Joule heating.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of making glass comprising:
   heating a glass feed material to a first temperature within a first melting furnace to form a glass melt;
   flowing the glass melt from the first melting furnace to a second melting furnace separate from the first melting furnace through a connecting tube comprising a refractory metal, the connecting tube further comprising an inside surface and an outside surface disposed between a first end and a second end wherein the second end is concentric with the outside surface of the tube and the inside surface of the second end is in direct contact with the back wall of the second melting furnace and positioned proximate a first intermediate position along the length of the tube;

heating the glass melt in the connecting tube to a second temperature at least substantially equal to the first temperature by flowing a current between the second end of the tube and a second intermediate position upstream of the first intermediate position, thereby electrically heating the tube at least within the back wall of the second furnace within which the connecting tube is inserted; and wherein the second end of the tube does not contact the outside of the tube at the first intermediate position.

2. The method according to claim 1 wherein the connecting tube is unheated within a front wall of the first melting furnace.

3. The method according to claim 1 wherein a melt rate of the second melting furnace is between about 50% and 90% of a melt rate of the first melting furnace.

4. The method according to claim 1 wherein the refractory metal is selected from the group consisting of ruthenium, rhodium, palladium, osmium, iridium, platinum, molybdenum, tungsten and alloys thereof.

5. The method according to claim 1 further comprising mechanically agitating the glass melt in the second melting furnace.

6. The method according to claim 5 wherein the mechanical agitation is performed by bubbling oxygen through the glass melt in the second melting furnace.

7. The method according to claim 1 further comprising controlling a partial pressure of hydrogen in an atmosphere in contact with an outside surface of the connecting tube.

8. The method according to claim 1 wherein the glass melt in the first melting furnace comprises a foam surface layer and the glass melt in the second melting furnace is substantially free of a foam surface layer.

9. The method according to claim 1 wherein the second temperature is greater than the first temperature.

10. The method according to claim 1 wherein a depth of the glass melt in the second melting furnace is between about 65% and 110% of a depth of the glass melt in the first melting furnace.

11. The method according to claim 1 wherein a length of the second melting furnace is between about 30% and 50% of the length of the first melting furnace.

12. An apparatus for making glass comprising:
a first melting furnace for heating a glass feed material to form a glass melt, the first melting furnace comprising a front wall;
a second melting furnace comprising a back wall;
a refractory metal tube for transporting the glass melt from the first melting furnace to the second melting furnace, the tube comprising an inside surface and an outside surface disposed between a first end and a second end, the tube connecting the first and second melting furnaces through openings in the front wall and back wall of the first and second furnaces, respectively, and wherein the second end of the tube is folded back so that the inside surface of the second end of the tube is in direct contact with the back wall of the second melting furnace, the second end being concentric with the outside surface of the tube and positioned proximate an intermediate position along a length of the tube;
an electrical connection with the second end for conveying an electrical current through the tube between the second end and the intermediate position; and
wherein the second end of the tube does not contact the outside of the tube at the intermediate position.

13. The apparatus according to claim 12 wherein the electrical connection comprises a flange that is cooled by a liquid.

14. The apparatus according to claim 12 further comprising a fining vessel downstream of and in fluid communication with the second melting furnace.

15. The apparatus according to claim 12 wherein a length of the second melting furnace is between about 30% and 50% of a length of the second melting furnace.

* * * * *